US012083571B2

(12) United States Patent
Murata

(10) Patent No.: US 12,083,571 B2
(45) Date of Patent: Sep. 10, 2024

(54) HOLLOW SHAFT

(71) Applicant: MUSASHI SEIMITSU INDUSTRY CO., LTD., Toyohashi (JP)

(72) Inventor: Shinichi Murata, Toyohashi (JP)

(73) Assignee: Musashi Seimitsu Industry Co., Ltd., Alchi (JP)

( * ) Notice: Subject to any disclaimer, the term of this patent is extended or adjusted under 35 U.S.C. 154(b) by 436 days.

(21) Appl. No.: 17/430,859

(22) PCT Filed: Mar. 19, 2020

(86) PCT No.: PCT/JP2020/012347
§ 371 (c)(1),
(2) Date: Aug. 13, 2021

(87) PCT Pub. No.: WO2020/189763
PCT Pub. Date: Sep. 24, 2020

(65) Prior Publication Data
US 2022/0143664 A1  May 12, 2022

(30) Foreign Application Priority Data
Mar. 20, 2019 (JP) .................................. 2019-052861

(51) Int. Cl.
*B21C 37/16* (2006.01)
*B21C 37/00* (2006.01)
(Continued)

(52) U.S. Cl.
CPC .............. *B21C 37/16* (2013.01); *B21C 37/00* (2013.01); *B21D 41/04* (2013.01); *B21D 51/10* (2013.01);
(Continued)

(58) Field of Classification Search
CPC ......... B21C 37/16; B21C 37/00; B21D 41/04; B21D 51/10; F16C 3/00; F16C 3/02; F16L 9/02; Y10S 138/11
(Continued)

(56) References Cited

U.S. PATENT DOCUMENTS 2,133,091 A * 10/1938 Gettig ....................... B21K 1/10
5,643,093 A *  7/1997 Breese ...................... F16C 3/02
                                                                    464/183
2011/0209802 A1  9/2011 Ho

FOREIGN PATENT DOCUMENTS

GB           832  * 11/1899 .................... 464/183
JP   S52-35629 B2   9/1977
(Continued)

OTHER PUBLICATIONS

Universal Joint and Driveshaft Design Manual, AE-7, Society of Automotive Engineers, Inc., Warrendale, PA, Chapter 4, pp. 177-181, TJ1079.S62. (Year: 1979).*

*Primary Examiner* — Greg Binda
(74) *Attorney, Agent, or Firm* — Carrier, Shende & Associates P.C.; Joseph P. Carrier; Jeffrey T. Gedeon

(57) ABSTRACT

A hollow shaft includes a cylindrical main body part and an extremity drawn part that is integrally connected to one end of the main body part on the same axis and whose diameter is made smaller than a diameter of the main body part by drawing processing, wherein an inner peripheral face of the main body part and an inner peripheral face of a base portion, which is continuous with one end side of the main body part, of the extremity drawn part are formed as cut faces that are subjected to cutting processing before the drawing processing, and an inner peripheral face of a tip portion, which is continuous with an extremity side of the base portion, of the extremity drawn part is a non-cut face. Accordingly, the hollow shaft can be molded with high (Continued)

shape precision while maintaining a low drawing ratio for an extremity drawn part.

1 Claim, 6 Drawing Sheets

(51) Int. Cl.
*B21D 41/04* (2006.01)
*B21D 51/10* (2006.01)
*F16C 3/00* (2006.01)
*F16C 3/02* (2006.01)
*F16L 9/02* (2006.01)

(52) U.S. Cl.
CPC ................. *F16C 3/00* (2013.01); *F16C 3/02* (2013.01); *F16L 9/02* (2013.01); *Y10S 138/11* (2013.01)

(58) Field of Classification Search
USPC ........................................................ 464/183
See application file for complete search history.

(56) References Cited

FOREIGN PATENT DOCUMENTS

| | | |
|---|---|---|
| JP | S63-8859 B2 | 2/1988 |
| JP | H03-56813 B2 | 8/1991 |
| JP | H05-23881 B2 | 4/1993 |
| JP | 2001-246524 A | 9/2001 |

* cited by examiner

HOLLOW SHAFT

TECHNICAL FIELD

The present invention relates to a hollow shaft that includes a cylindrical main body part and an extremity drawn part that is integrally connected to one end of the main body part on the same axis and whose diameter is made smaller than a diameter of the main body part by drawing processing.

BACKGROUND ART

Obtaining a hollow shaft having an extremity drawn part whose diameter is made smaller so as to be tapered at the tip by drawing processing an extremity part of a pipe material is conventionally known as shown in, for example, Patent Document 1.

PRIOR ART DOCUMENTS

Patent Documents

Patent Document 1: Japanese Patent Publication No. 52-35629

SUMMARY OF THE INVENTION

Problems to be Solved by the Invention

When producing a hollow shaft by drawing processing an extremity part of a cylindrical pipe material, if in order to make an extremity drawn part have a predetermined small internal diameter, a large drawing ratio is set for the external diameter (that is, external diameter before drawing processing/external diameter after drawing processing), there is a possibility that not only the extremity drawn part but also a cylindrical main body part that is continuous with the extremity drawn part will be deformed. Because of this, there is the problem that it is difficult to mold an extremity drawn part-equipped hollow shaft with high overall shape precision, etc.

The present invention has been proposed in light of the above circumstances, and it is an object thereof to provide a hollow shaft that can be molded with high shape precision by enabling a predetermined small internal diameter to be obtained while maintaining a low drawing ratio for an extremity drawn part, and that can increase the rigidity and strength of the hollow shaft by making it possible to suppress any stress concentration occurring in a border part between the extremity drawn part and a main body part accompanying drawing processing.

Means for Solving the Problems

In order to attain the above object, according to a first aspect of the present invention, there is provided a hollow shaft comprising a cylindrical main body part and an extremity drawn part that is integrally connected to one end of the main body part on the same axis and whose diameter is made smaller than a diameter of the main body part by drawing processing, characterized in that an inner peripheral face of the main body part and an inner peripheral face of a base portion, which is continuous with one end of the main body part, of the extremity drawn part are formed as cut faces that are subjected to cutting processing before the drawing processing, and an inner peripheral face of a tip portion, which is continuous with an extremity side of the base portion, of the extremity drawn part is a non-cut face.

Further, according to a second aspect of the present invention, there is provided the hollow shaft having the first aspect, formed by subjecting a pipe material to drawing processing, wherein the pipe material comprises the cylindrical main body part having the inner peripheral face as a cut face and an extremity part that is integrally connected to one end of the main body part on the same axis, an inner peripheral face of an extremity part base portion, which is connected to the one end side of the main body part, of the extremity part is a tapered cut face that gradually decreases in diameter in going toward an extremity of the extremity part, an inner peripheral face of an extremity part tip portion that is connected to an extremity side of the extremity part base portion is a non-cut face, and an inclination angle of the inner peripheral face of the extremity part base portion with respect to a shaft axis is smaller than a drawing angle of the extremity drawn part formed by subjecting the extremity part to the drawing processing.

Furthermore, according to a third aspect of the present invention, in addition to the second aspect, the inner peripheral face of the extremity part base portion includes a first curved face that smoothly joins the inner peripheral face of the extremity part base portion to the inner peripheral face of the main body part, and a second curved face that smoothly joins the inner peripheral face of the extremity part base portion to the inner peripheral face of the extremity part tip portion.

Effects of the Invention

In accordance with the first aspect of the present invention, with regard to the extremity drawn part, prior to this being subjected to drawing processing, the inner peripheral face of the base portion, which is connected to one end side of the main body part, is cut, whereas the inner peripheral face of the tip portion, which is connected to the extremity side of the base portion, is not cut, and it is possible for a sufficient thickness to remain after drawing processing; it is possible to obtain a predetermined internal diameter while maintaining a small drawing ratio, it is therefore more difficult for the main body part to be deformed during drawing processing, and it is possible to mold the hollow shaft with high overall shape precision. Furthermore, since cutting processing before drawing processing is carried out not only for the main body part but also up to part of the extremity drawn part (that is, the base portion), the entirety of the inner peripheral face of the main body part can be reliably subjected to cutting processing, and this is further advantageous in terms of enhancing the shape precision of the main body part. Moreover, since the border between the cut face and a non-cut face of the inner peripheral face of the hollow shaft before drawing processing is positioned on an intermediate part of the extremity drawn part (that is, the border between the base portion and the tip portion) and is distant from the starting point of drawing processing, even if a slight step remains on the border between the cut face and the non-cut face, it will not readily cause stress concentration at the starting point of drawing processing, it is possible to accordingly suppress any stress concentration occurring during drawing processing in the vicinity of the border between the extremity drawn part and the main body part. Therefore, in synergy with the effect in enhancing the shape precision as described above, it can greatly contribute to increasing the rigidity and strength of the hollow shaft.

Furthermore, in accordance with the second aspect, in the pipe material prior to the hollow shaft being subjected to drawing processing, the inner peripheral face of the extremity part base portion, which is connected to one end side of the main body part, of the extremity part as a target of the drawing processing is a tapered cut face that gradually decreases in diameter in going toward the extremity of the extremity part, the inner peripheral face of the extremity part tip portion thereof, which is connected to the extremity side of the extremity part base portion, is a non-cut face, the inclination angle, with respect to the shaft axis, of the tapered inner peripheral face of the extremity part base portion is set to be smaller than the drawing angle of the extremity drawn part, which is formed by subjecting the extremity part to drawing processing, and it is thereby possible to suppress effectively the formation of a step at the end of the inner peripheral face (cut face) due to the tapered inner peripheral face of the extremity part base portion protruding excessively toward the radially inner side accompanying drawing processing. Therefore, it is possible to form an inner peripheral face that is as smooth as possible in an area from the main body part to the extremity of the extremity drawn part after the drawing processing.

Moreover, in accordance with the third aspect, since the inner peripheral face of the extremity part base portion of the pipe material includes the first curved face, which smoothly joins the inner peripheral face of the extremity part base portion to the inner peripheral face of the main body part, and the second curved face, which smoothly joins it to the inner peripheral face of the extremity part tip portion, it becomes more difficult for stress concentration to occur during drawing processing in border parts between the inner peripheral face of the extremity part base portion and the inner peripheral faces of the main body part and the extremity part tip portion, and not only is it possible to suppress effectively processing defects, but it is also possible to further increase the rigidity and strength of the hollow shaft.

EXPLANATION OF REFERENCE NUMERALS AND SYMBOLS

Figure 1:
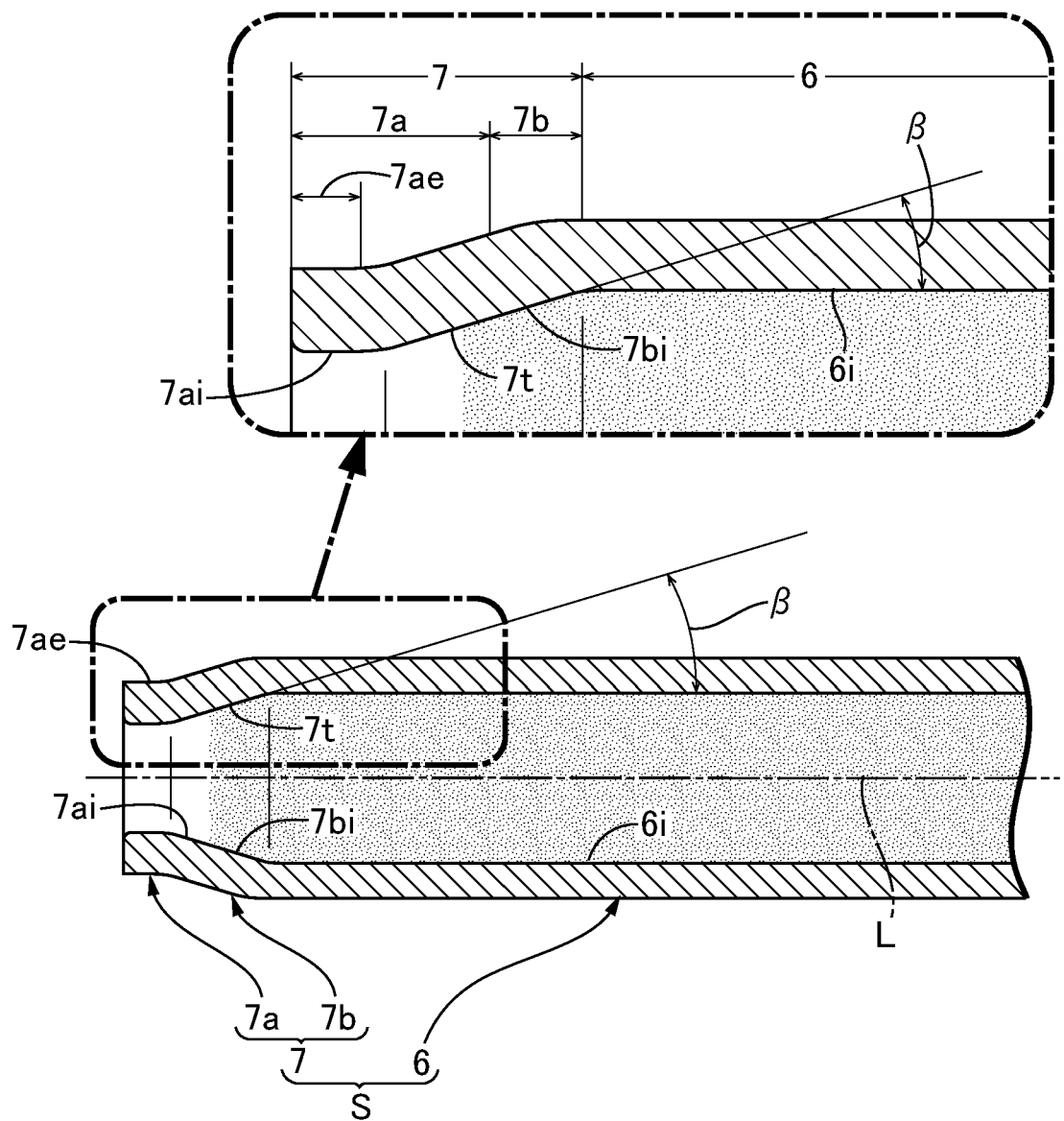
FIG. 1 is a sectional view of an essential part of a hollow shaft related to a first embodiment of the present invention. (first embodiment)

B Pipe material
L Shaft axis
S Hollow shaft
α Inclination angle of inner peripheral face of extremity part base portion with respect to shaft axis
β Drawing angle of extremity drawn part
r1, r2 First and second curved faces
6 Main body part
6i Inner peripheral face
7 Extremity drawn part
7a Tip portion of extremity drawn part
7ai Inner peripheral face of tip portion
7b Base portion of extremity drawn part
7bi Inner peripheral face of base portion
17 Extremity part
17a Extremity part base portion
17ai Inner peripheral face of extremity part tip portion
17b Extremity part base portion
17bi Inner peripheral face of extremity part base portion

MODES FOR CARRYING OUT THE INVENTION

Embodiments of the present invention are explained below by reference to the attached drawings.

First Embodiment

Figure 2:
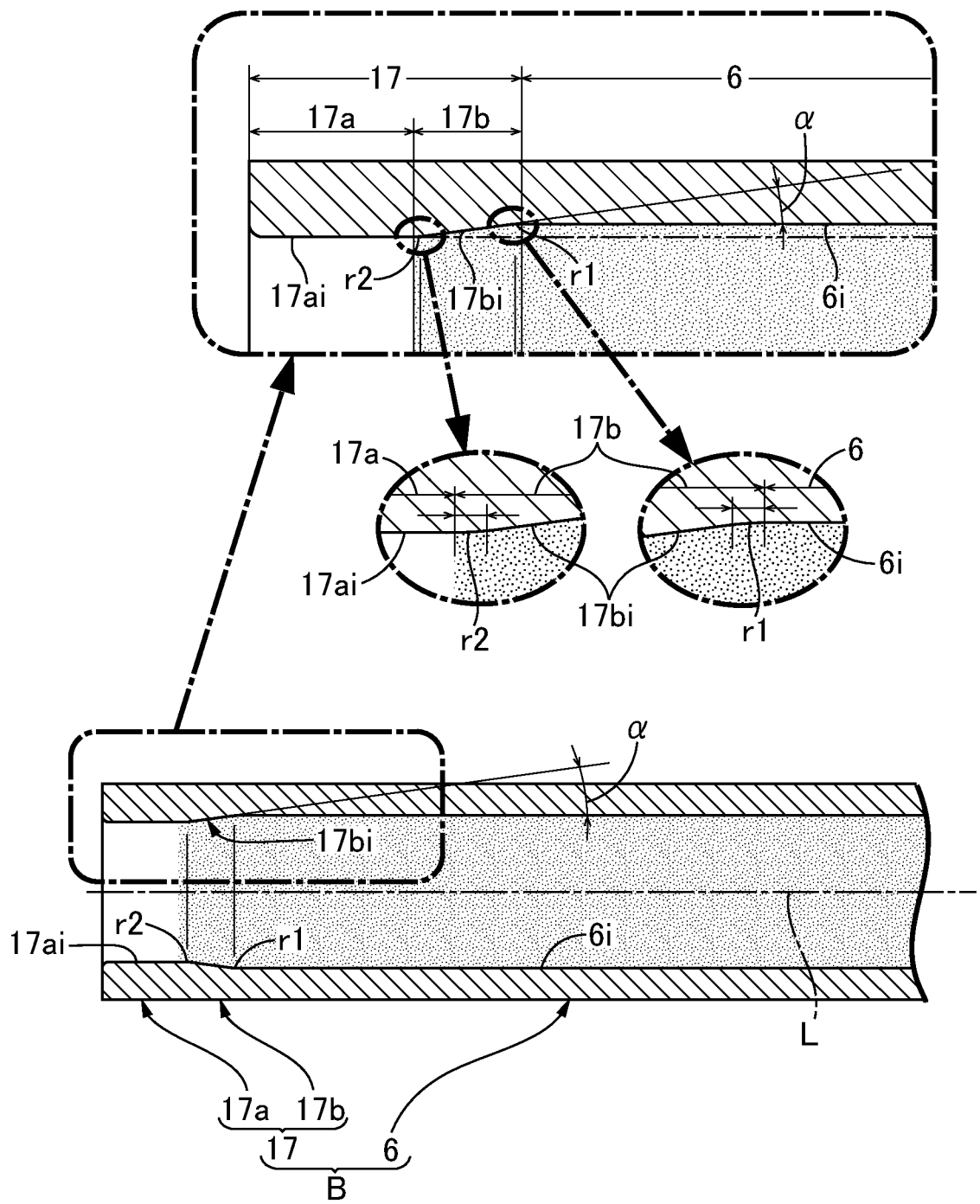
FIG. 2 is a sectional view of an essential part of a pipe material prior to subjecting the hollow shaft to drawing processing. (first embodiment)
Figure 3:
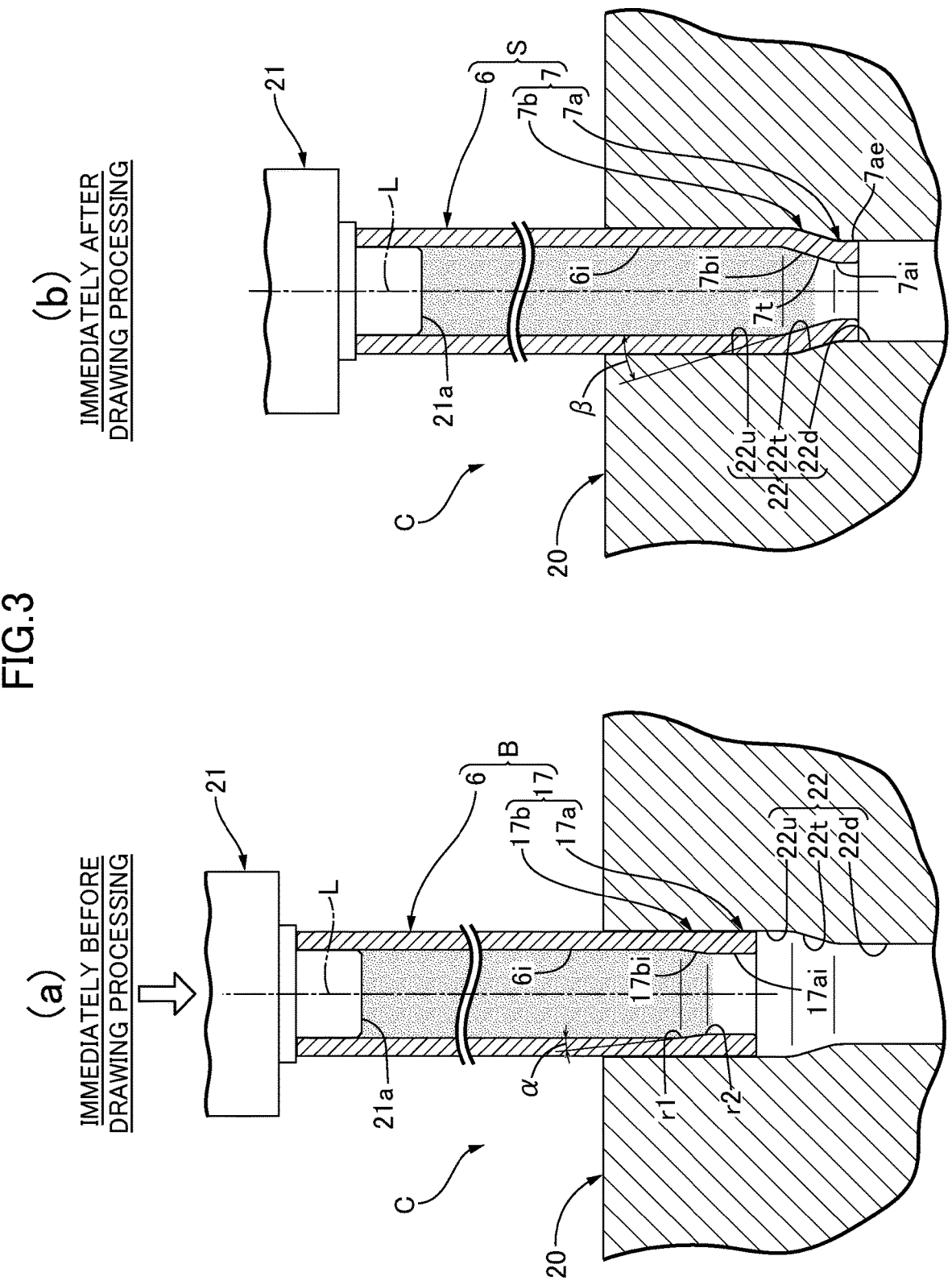
FIG. 3 shows one example of a drawing processing step, FIG. 3(a) being a diagram showing the state immediately before drawing processing and FIG. 3(b) being a diagram showing the state immediately after drawing processing. (first embodiment)

FIG. 1 to FIG. 3 show a first embodiment. A hollow shaft S shown in FIG. 1 is made of a metal in its entirety, and includes a cylindrical pipe-shaped main body part 6 and an extremity drawn part 7 that is integrally connected to one end of the main body part 6 on the same axis and is tapered at the tip by drawing processing so as to have a diameter that is smaller than that of the main body part 6. The application and function of the hollow shaft S may be selected in various ways and, for example, it can be implemented as a power transmission shaft that rotates at high speed.

In the hollow shaft S, an inner peripheral face 6i of the main body part 6 and an inner peripheral face 7bi of a base portion 7b, which is integrally continuous with one end of the main body part 6, of the extremity drawn part 7 are formed as cut faces by continuously subjecting them to cutting processing before drawing processing of the extremity drawn part 7. On the other hand, an inner peripheral face 7ai of a tip portion 7a, which is integrally continuous with the extremity side of the base portion 7b, of the extremity drawn part 7 is a non-cut face, that is, it has not been subjected to cutting processing. In each drawing, a region that is a cut face formed by cutting processing before drawing processing is shown by shading.

FIG. 2 shows one example of a pipe material B prior to the hollow shaft S being subjected to drawing processing.

The pipe material B includes a cylindrical main body part 6 whose inner peripheral face 6i is a cut face and a cylindrical extremity part 17 that is integrally connected to one end of the main body part 6 on the same axis.

In the pipe material B, the extremity part 17 includes an extremity part base portion 17b that is integrally connected to one end side of the main body part 6 and an extremity part tip portion 17a that is integrally connected to the extremity side of the extremity part base portion 17b. An inner peripheral face 17bi of the extremity part base portion 17b is formed as a tapered cut face that gradually decreases in diameter in going from the main body part 6 to the extremity of the extremity part 17. The double-dotted broken line of FIG. 2 shows the peripheral face of the pipe material B prior to being subjected to cutting processing.

The inner peripheral face 17bi of the extremity part base portion 17b has, at opposite ends of the inner peripheral face 17*bi* of the extremity part base portion 17*b*, a first curved face r1 that has an arc-shaped cross section and smoothly joins the inner peripheral face 17*bi* to the inner peripheral face 6*i* of the main body part 6, and a second curved face r2 that has an arc-shaped cross section and smoothly joins the inner peripheral face 17*bi* to an inner peripheral face 17*ai* of the extremity part tip portion 17*a*. Therefore, the opposite ends of the inner peripheral face 17*bi* of the extremity part base portion 17*b* are steplessly and smoothly connected to the inner peripheral face 6*i* of the main body part 6 and the inner peripheral face 17*ai* of the extremity part tip portion 17*a*.

In the present embodiment, both the first and second curved faces r1, r2 are formed by cutting processing. Therefore, the inner peripheral face 6*i* of the main body part 6 and the inner peripheral face 17*bi*, including the first and second curved faces r1, r2, of the extremity part base portion 17*b* can be continuously subjected to cutting processing.

On the other hand, the inner peripheral face 17*ai* of the extremity part tip portion 17*a*, which is connected to the extremity side of the extremity part base portion 17*b*, of the extremity part 17 is a non-cut face, that is, it has not been subjected to cutting processing.

An inclination angle $\alpha$ of the tapered inner peripheral face 17*bi* of the extremity part base portion 17*b* with respect to a shaft axis L is set to be smaller than a drawing angle $\beta$ of the extremity drawn part 7, which is formed by subjecting the extremity part 17 to drawing processing. The drawing angle $\beta$ corresponds to an inclination angle, with respect to the shaft axis L, of a tapered face 7*t* formed by subjecting the inner peripheral face of the extremity drawn part 7 to drawing processing.

The operation of the first embodiment is now explained by referring in addition to FIG. 3.

A method for manufacturing the hollow shaft S of the present embodiment includes, for example, a step of cutting the inner peripheral face of the cylindrical pipe-shaped pipe material B and a drawing processing step of subjecting only the extremity part 17 of the pipe material B, having been subjected to the cutting step, to drawing processing so as to make the diameter thereof smaller than that of the main body part 6.

In the cutting step, the inner peripheral face 6*i* of the main body part 6 having a cylindrical shape is subjected to cutting processing so as to have a predetermined internal diameter, and at the same time the inner peripheral face 17*bi* of the extremity part base portion 17*b*, which is connected to one end of the main body part 6, is subjected to cutting processing so as to have a tapered face shape that is thinner at the tip (opposite ends thereof becoming the first and second curved faces r1, r2), but the inner peripheral face 17*ai* of the extremity part tip portion 17*a*, which is connected to the extremity side of the extremity part base portion 17*b*, is a non-cut face.

FIG. 3 shows one example of the drawing processing step, (a) showing the state immediately before drawing processing and (b) showing the state immediately after drawing processing.

A molding device C used in the drawing processing includes, for example, a fixed mold main body 20 and a pressing mold 21 that can be moved up and down with respect to the mold main body 20. The mold main body 20 has a molding hole 22 that is open via an upper face and can fittingly support the extremity part 17 and part of the main body part 6 of the pipe material B.

The molding hole 22 includes a tapered molding face 22*t* that is for subjecting the extremity part 17 of the pipe material B to drawing processing (that is, decreasing the diameter so as to be smaller at the tip) in cooperation with the pressing mold 21, a main body part-retaining face 22*u* that is continuous with a large diameter end (upper end) of the tapered molding face 22*t* and extends upward, and an extremity molding face 22*d* that is continuous with a small diameter end (lower end) of the tapered molding face 22*t* and extends downward. A smooth connection is provided between the large diameter end of the tapered molding face 22*t* and the main body part-retaining face 22*u* and between the small diameter end of the tapered molding face 22*t* and the extremity molding face 22*d* via a curved face having an arc-shaped cross section.

Provided integrally with the pressing mold 21 is a retaining portion 21*a* that protrudes from a lower face of the pressing mold 21 and can fittingly retain an upper end part of the pipe material B.

In the drawing processing step, for example, as shown in FIG. 3(*a*), a lower end part, that is, the extremity part 17 of the pipe material B having its upper end part fittingly retained by the retaining portion 21*a* of the pressing mold 21, is fittingly inserted into the molding hole 22 of the mold main body 20, in particular the main body part-retaining face 22*u*. Subsequently, as shown in FIG. 3(*b*), pushing down the pipe material B by means of the pressing mold 21 and pushing the extremity part 17 of the pipe material B into the tapered molding face 22*t* so as to follow the tapered molding face 22*t* carries out drawing processing. Subjecting the extremity part 17 to drawing processing forms the extremity drawn part 7, which is tapered at the tip.

In the illustrated example, the pressing mold 21 pushes down the pipe material B until the lower end of the extremity part 17 passes the tapered molding face 22*t* of the molding hole 22 and enters the extremity molding face 22*d* by a predetermined amount. This forms a short cylindrical tube portion Tae so as to follow the extremity molding face 22*d* on the tip portion 7*a* of the extremity drawn part 7 after drawing processing.

In accordance with the first embodiment, in the hollow shaft S, including the cylindrical main body part 6 and the extremity drawn part 7, which is decreased in diameter and is integrally connected to one end of the main body part 6, the inner peripheral face 6*i* of the main body part 6 and the inner peripheral face 7*bi* of the base portion 7*b*, which is connected to one end side of the main body part 6, of the extremity drawn part 7, are formed as cut faces that are continuously subjected to cutting processing before the drawing processing, whereas the inner peripheral face Tai of the tip portion 7*a*, which is connected to the extremity side of the base portion 7*b*, of the extremity drawn part 7, is a non-cut face.

Since the extremity drawn part 7 still has a sufficient thickness due to the inner peripheral face Tai of the tip portion 7*a* not being cut prior to it being subjected to drawing processing, a predetermined internal diameter can be obtained while keeping a small drawing ratio for drawing processing, as a result it is more difficult for the main body part 6 to be deformed during drawing processing, and the hollow shaft S can be molded with high shape precision overall. Therefore, when the hollow shaft S is for example used as a power transmission shaft that rotates at high speed, high shape precision is advantageous in terms of suppressing center run-out due to high speed rotation. Moreover, since cutting processing before drawing processing is carried out over the entire region from the inner peripheral face 6*i* of the main body part 6 to the inner peripheral face 7*bi* of part (that is, the base portion 7*b*) of the extremity drawn part 7, the entirety of the inner peripheral face 6*i* of the main body part 6 can be reliably subjected to cutting processing, and this is further advantageous in terms of enhancing the shape precision of the main body part 6.

The border between the cut face and a non-cut face of the inner peripheral face of the hollow shaft S before drawing processing is positioned on an intermediate part of the extremity drawn part 7 (that is, the border between the base portion 7*b* and the tip portion 7*a*) and is distant from the starting point of drawing processing. Therefore, even if a slight step remains on the border between the cut face and the non-cut face (refer to, for example, a second embodiment that is described later), it will not readily cause stress concentration at the starting point of drawing processing, it is possible to accordingly suppress any stress concentration occurring during drawing processing in the vicinity of the border between the extremity drawn part 7 and the main body part 6, and in synergy with the effect in enhancing the shape precision as described above it can greatly contribute to increasing the rigidity and strength of the hollow shaft S.

In the present embodiment, in the pipe material B prior to the hollow shaft S being subjected to drawing processing, the inner peripheral face 17*bi* of the extremity part base portion 17*b*, which is connected to one end of the main body part 6, of the extremity part 17 as a target of the drawing processing is a tapered cut face that gradually decreases in diameter in going from the main body part 6 toward the extremity of the extremity part 17, and the inner peripheral face 17*ai* of the extremity part tip portion 17*a* thereof, which is connected to the extremity part base portion 17*b*, is a non-cut face. Moreover, the inclination angle, with respect to the shaft axis L, of the tapered inner peripheral face 17*bi* of the extremity part base portion 17*b* is set to be smaller than the drawing angle β of the extremity drawn part 7 (that is, the inclination angle, with respect to the shaft axis L, of the tapered face 7*t*, which is tapered at the tip, on the inner peripheral face of the extremity drawn part 7). It is thereby possible to suppress effectively the formation of a step at the end of the inner peripheral face 17*bi* (cut face) due to the inner peripheral face 17*bi* as a cut face of the extremity part base portion 17*b* protruding excessively toward the radially inner side accompanying drawing processing, and it is therefore possible to form a smooth inner peripheral face in an area from the main body part 6 to the extremity of the extremity drawn part 7 after the drawing processing.

Furthermore, since the inner peripheral face 17*bi* of the extremity part base portion 17*b* has the first curved face r1, which smoothly joins the inner peripheral face 17*bi* to the inner peripheral face 6*i* of the main body part 6, and the second curved face r2, which smoothly joins it to the inner peripheral face 17*ai* of the extremity part tip portion 17*a*, it becomes more difficult for stress concentration to occur during drawing processing in border parts between the inner peripheral face 17*bi* of the extremity part base portion 17*b* and the inner peripheral faces 6*i*, 17*ai* of the main body part 6 and the extremity part tip portion 17*a*, and not only is it possible to suppress effectively processing defects, but it is also possible to further increase the rigidity and strength of the hollow shaft S.

Second Embodiment

Figure 4:
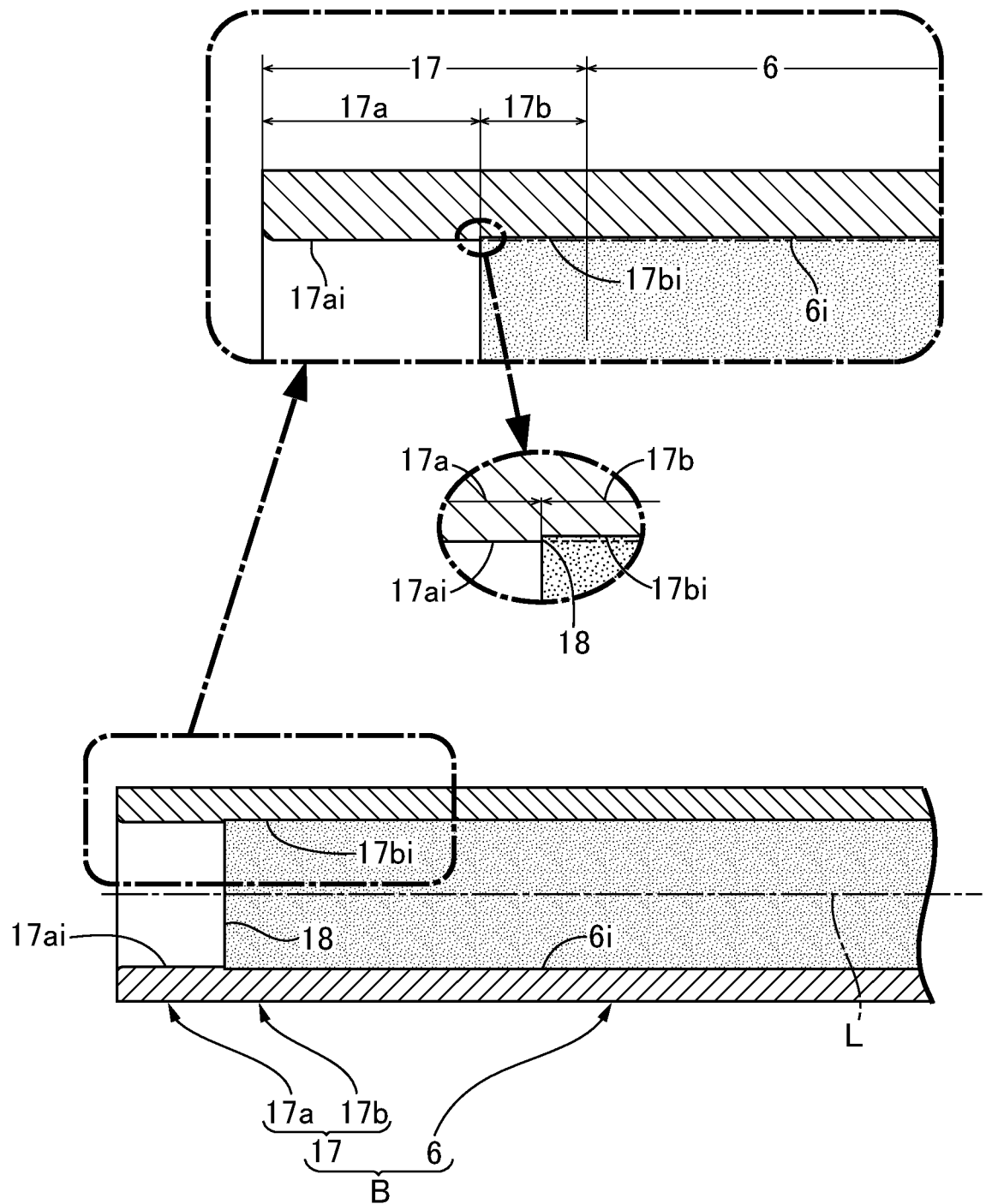
FIG. 4 is a sectional view (a view corresponding to FIG. 2) of an essential part of a pipe material related to a second embodiment. (second embodiment)
Figure 5:
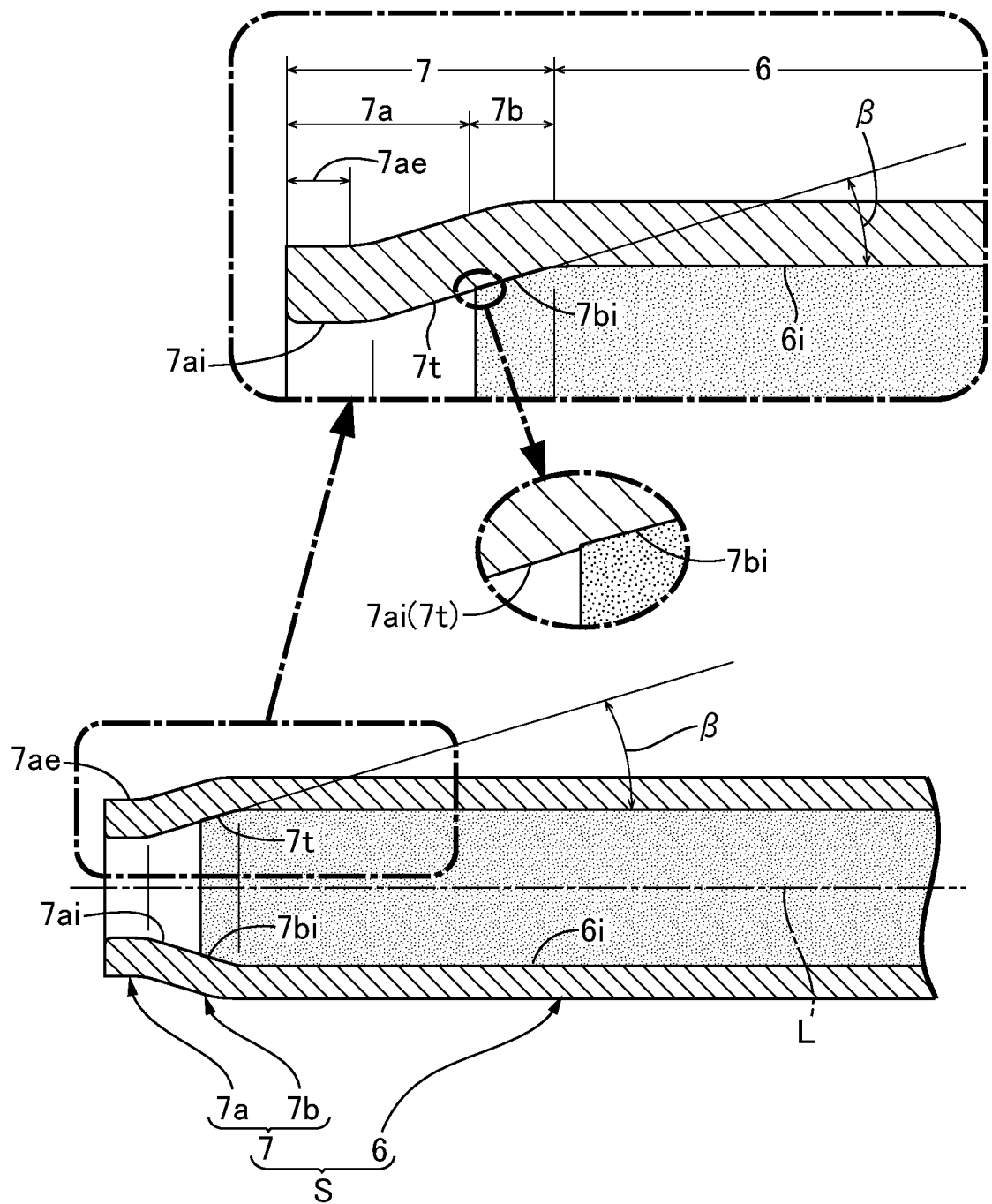
FIG. 5 is a sectional view (a view corresponding to FIG. 1) of an essential part of a hollow shaft related to the second embodiment. (second embodiment)

FIG. 4 and FIG. 5 show a second embodiment. In the first embodiment, in the extremity part 17 of the pipe material B, the inner peripheral face 17*bi* of the extremity part base portion 17*b* is formed as a tapered cut face that is tapered at the tip, but in the second embodiment the inner peripheral face 17*bi* of the extremity part base portion 17*b* is formed as a cylindrically cut face in which each part has a uniform equal diameter. Therefore, before drawing processing, a very small step 18 corresponding to the amount of cutting is formed between the inner peripheral face 17*bi* (cut face) of the extremity part base portion 17*b* and the inner peripheral face 17*ai* (non-cut face) of the extremity part tip portion 17*a*. In addition, the double-dotted broken line of FIG. 4 shows the inner peripheral face of the pipe material B before cutting processing.

In the second embodiment also, with regard to the inner peripheral face of the pipe material B, not only the inner peripheral face 6*i* of the cylindrical main body part 6 but also the entire area up to the inner peripheral face 17*bi* of the extremity part base portion 17*b* are formed as cut faces, and it is therefore possible to achieve the same operational effects as those of the first embodiment except, among the operational effects of the first embodiment described above, in particular the operational effect based on the inner peripheral face 17*bi* of the extremity part base portion 17*b* being a tapered cut face and the operational effect based on the first and second curved faces r1, r2.

In a structure in which, as in the second embodiment, the inner peripheral face 17*bi* as a cut face of the extremity part base portion 17*b* is not tapered, the amount of protruding deformation, accompanying drawing processing, of the inner peripheral face 17*bi* of the extremity part base portion 17*b* toward the inside in the radial direction is relatively large, and there is a possibility that a slight step will remain at the end of the inner peripheral face 17*bi* (that is, between the inner peripheral face 17*bi* (cut face) and the inner peripheral face 17*ai* (non-cut face) of the extremity part tip portion 17*a*) even after drawing processing. On the other hand, in the first embodiment, it is possible, by making the inner peripheral face 17*bi* of the extremity part base portion 17*b* a tapered cut face as described above, to suppress effectively the formation of a step at the end of the inner peripheral face 17*bi* (cut face) due to the inner peripheral face 17*bi* protruding excessively toward the inside in the radial direction accompanying drawing processing.

Third Embodiment

Figure 6:
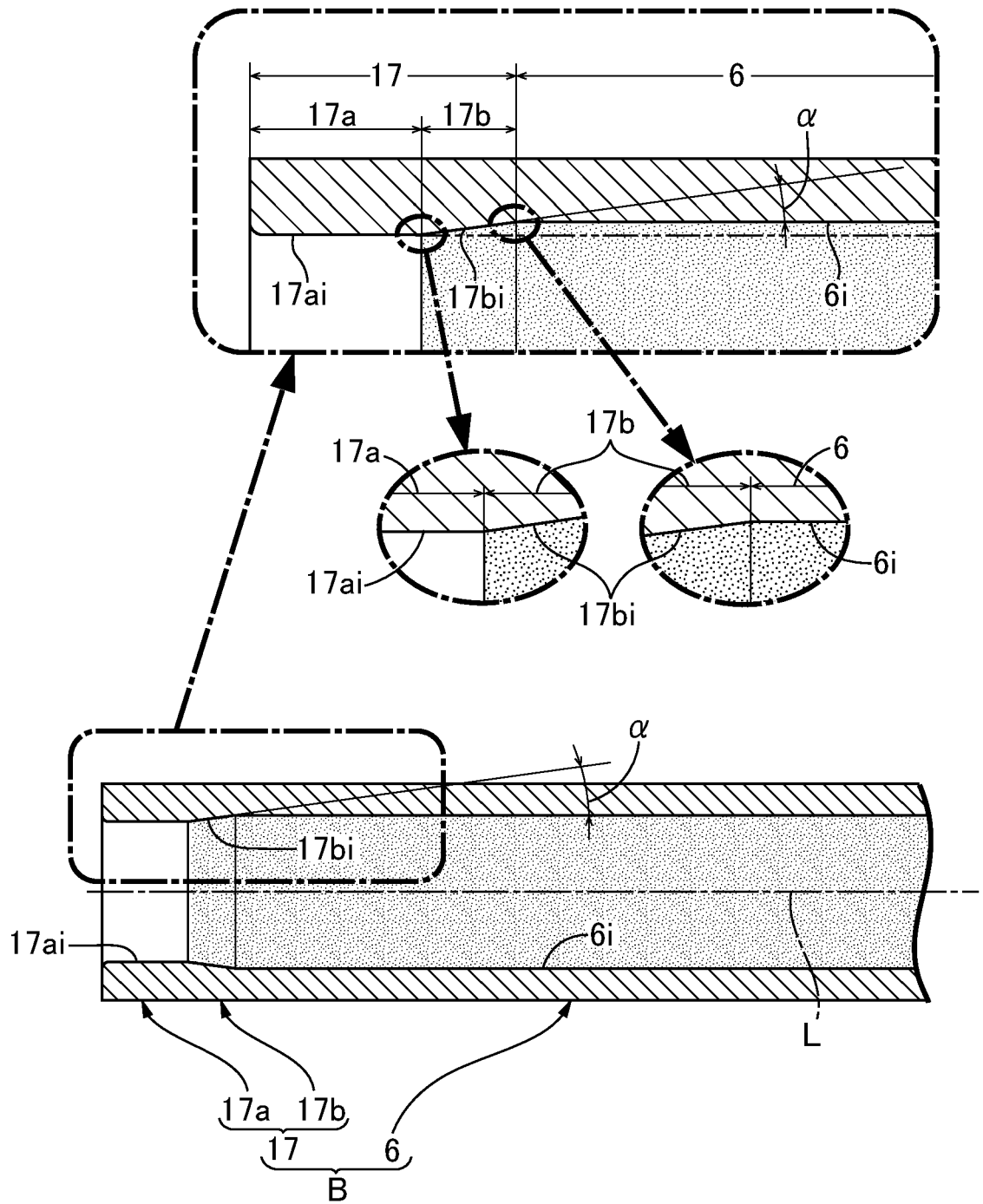
FIG. 6 is a sectional view (a view corresponding to FIG. 2) of an essential part of a pipe material related to a third embodiment. (third embodiment)

FIG. 6 shows a third embodiment. In the first embodiment, the inner peripheral face 17*bi* of the extremity part base portion 17*b* of the pipe material B includes the first curved face r1 smoothly joining the inner peripheral face 17*bi* to the inner peripheral face 6*i* of the main body part 6 and the second curved face r2 smoothly joining it to the inner peripheral face 17*ai* of the extremity part tip portion 17*a*, but in the third embodiment the first and second curved faces r1, r2 are eliminated. That is, a base end of the tapered inner peripheral face 17*bi* of the extremity part base portion 17*b* of the pipe material B is connected directly to the inner peripheral face 6*i* of the main body part 6 without the first curved face r1, and the extremity of the inner peripheral face 17*bi* is connected directly to the inner peripheral face 17*ai* of the extremity part tip portion 17*a* without the second curved face r2.

In the third embodiment also, with regard to the inner peripheral face of the pipe material B, not only the inner peripheral face 6*i* of the cylindrical main body part 6 but also the entire area up to the tapered inner peripheral face 17*bi* of the extremity part base portion 17*b* are formed as cut faces, and it is therefore possible to achieve the same operational effects as those of the first embodiment except, among the operational effects of the first embodiment described above, in particular the operational effect based on the first and second curved faces r1, r2.

In addition, in the third embodiment, on the inner peripheral face 17bi of the extremity part base portion 17b, both the first and second curved faces r1, r2 are eliminated, but as a modified example (not illustrated) of the third embodiment, for example, either one of the first and second curved faces r1, r2 may be eliminated.

Embodiments of the present invention are explained above, but the present invention is not limited to the embodiments and may be modified in a variety of ways as long as the modifications do not depart from the subject matter.

For example, the embodiments show a case in which the drawing step is carried out in one stage, but the drawing step may be carried out in multiple stages. In this case, for example, a plurality of kinds of mold main body 20 in which the tapered molding face 22t of the molding hole 22 has a different shape are prepared, and they are used in sequence so as to carry out drawing processing for a blank (pipe material B) so that the extremity part 17 is decreased in diameter stepwise.

Furthermore, the embodiments show a case in which the second curved face r2 is formed by cutting processing as for the first curved face r1, but the second curved face r2 may be formed by machining processing other than cutting processing (for example, grinding processing).

The invention claimed is:

1. A hollow shaft comprising a cylindrical main body part and an extremity drawn part that is integrally connected to one end of the main body part on the same axis and whose diameter is made smaller than a diameter of the main body part by drawing processing,
   wherein an inner peripheral face of the main body part and an inner peripheral face of a base portion, which is continuous with said one end of the main body part, of the extremity drawn part are formed as machining faces,
   an inner peripheral face of a tip portion, which is continuous with an extremity side of the base portion, of the extremity drawn part is formed as a non-machining face,
   a border between the machining faces and the non-machining face is positioned on a tapered face of the extremity drawn part, and
   a thickness of the hollow shaft in a range from the border to the tip portion is greater than a thickness of the hollow shaft in a range from the border to the base portion.

* * * * *